United States Patent
Wu et al.

(10) Patent No.: US 11,086,183 B2
(45) Date of Patent: Aug. 10, 2021

(54) DIMMER, MANUFACTURING METHOD THEREOF, BACKLIGHT UNIT AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Shouzheng Wu, Beijing (CN); Qing Zhang, Beijing (CN); Jun Xu, Beijing (CN); Haozhi Niu, Beijing (CN); Zhigang Ouyang, Beijing (CN); Ji Shao, Beijing (CN); Baoqing Yin, Beijing (CN); Xiaojun Wang, Beijing (CN); Dapeng Liu, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 16/321,771

(22) PCT Filed: Jun. 5, 2018

(86) PCT No.: PCT/CN2018/089891
§ 371 (c)(1),
(2) Date: Jan. 29, 2019

(87) PCT Pub. No.: WO2019/024596
PCT Pub. Date: Feb. 7, 2019

(65) Prior Publication Data
US 2020/0355973 A1    Nov. 12, 2020

(30) Foreign Application Priority Data
Aug. 4, 2017   (CN) .................. 201710660857.X

(51) Int. Cl.
*G02F 1/157*  (2006.01)
*G02F 1/163*  (2006.01)
(Continued)

(52) U.S. Cl.
CPC ........... *G02F 1/157* (2013.01); *G02B 6/0051* (2013.01); *G02B 6/0053* (2013.01);
(Continued)

(58) Field of Classification Search
CPC .......... G02F 1/157; G02F 1/153; G02F 1/163; G02F 1/133615
See application file for complete search history.

(56) References Cited

U.S. PATENT DOCUMENTS

2009/0002800 A1* 1/2009 Nakaho .................. G02F 1/153
                                                                  359/268
2009/0323158 A1* 12/2009 Wang ..................... G02F 1/153
                                                                  359/269
(Continued)

FOREIGN PATENT DOCUMENTS

CN      101833932 A      9/2010
CN      104122730 A     10/2014
(Continued)

OTHER PUBLICATIONS

International Search Report and Written Opinion of the International Searching Authority (with English language translation of Written Opinion), International Application No. PCT/CN2018/089891, dated Aug. 16, 2018, 14 pp.
First Office Action with English language translation, CN Application No. 201710660857.X, dated May 28, 2019, 16 pp.

*Primary Examiner* — Karabi Guharay
(74) *Attorney, Agent, or Firm* — Myers Bigel, P.A.

(57) ABSTRACT

The present disclosure provides a dimmer and a manufacturing method thereof, a backlight unit and a display device. The dimmer includes at least one brightness adjusting unit.
(Continued)

Each brightness adjusting unit includes a reflective layer and an electrochromic layer stacked over each other, and the electrochromic layer is configured to be reversibly switchable between a transparent state and a color rendering state.

16 Claims, 3 Drawing Sheets

(51) Int. Cl.
  *F21V 8/00* (2006.01)
  *G02F 1/155* (2006.01)
(52) U.S. Cl.
  CPC ........... *G02B 6/0055* (2013.01); *G02F 1/155* (2013.01); *G02F 1/163* (2013.01)

(56) References Cited

U.S. PATENT DOCUMENTS

| | | | |
|---|---|---|---|
| 2012/0140310 A1* | 6/2012 | Huang | ................... G02F 1/163 359/265 |
| 2015/0168796 A1 | 6/2015 | Yashiro et al. | |
| 2016/0349589 A1 | 12/2016 | Sun et al. | |

FOREIGN PATENT DOCUMENTS

| | | |
|---|---|---|
| CN | 104487890 A | 4/2015 |
| CN | 104749837 A | 7/2015 |
| CN | 104834146 A | 8/2015 |
| CN | 106019716 A | 10/2016 |
| CN | 107340663 A | 11/2017 |
| JP | 2003149686 A | 5/2003 |
| KR | 1020080095976 A | 10/2008 |

* cited by examiner

DIMMER, MANUFACTURING METHOD THEREOF, BACKLIGHT UNIT AND DISPLAY DEVICE

CROSS REFERENCE TO RELATED APPLICATION(S)

The present application is a 35 U.S.C. 371 national stage application of PCT International Application No. PCT/CN2018/089891, filed on Jun. 5, 2018, which claims priority to Chinese Patent Application No. 201710660857.X filed on Aug. 4, 2017, the contents of which are incorporated herein by reference in their entireties.

TECHNICAL FIELD

The present disclosure relates to the field of display technology, in particular to a dimmer, a manufacturing method thereof, a backlight unit and a display device.

BACKGROUND

For a normal display, the brightness of backlight is generally constant, and different brightness is displayed only by different grayscale settings of the panel. In such a case, it is difficult to highlight an area that should be bright because the entire screen is uniform, resulting in a low contrast. In a high-dynamic range (HDR) display, the brightness of backlight can be dynamically adjusted. In this way, a larger adjusting range of brightness can be achieved, which helps to improve contrast and achieve HDR display. In other words, the HDR display can be made to be darker in dark areas and brighter in bright areas. Therefore, HDR images can achieve greater dynamic range and more image detail than normal images. For HDR images, the key parameter is the contrast.

SUMMARY

According to an aspect of the present disclosure, a dimmer is provided in an embodiment. Specifically, the dimmer includes at least one brightness adjusting unit, wherein each brightness adjusting unit includes a reflective layer and an electrochromic layer stacked over each other, and the electrochromic layer is configured to be reversibly switchable between a transparent state and a color rendering state.

According to some embodiments of the present disclosure, in the dimmer proposed above, each brightness adjusting unit further includes an electrolyte layer and an ion storage layer stacked sequentially on a side of the electrochromic layer facing the reflective layer.

According to some embodiments of the present disclosure, in the dimmer proposed above, each brightness adjusting unit further includes a first electrode and a second electrode, wherein the first electrode is disposed on a side of the ion storage layer close to the reflective layer, and the second electrode is disposed on a side of the electrochromic layer away from the reflective layer.

According to some embodiments of the present disclosure, in the dimmer proposed above, the reflective layer is made of a conductive material. Further, the dimmer further includes a second electrode disposed on a side of the electrochromic layer away from the reflective layer.

According to some embodiments of the present disclosure, in the dimmer proposed above, the ion storage layer includes vanadium pentoxide ions or iridium oxide. Alternatively, the electrolyte layer includes lithium perchlorate ions or sodium perchlorate ions. Further, the electrochromic layer is made of titanium dioxide, tungsten trioxide, polythiophene, viologen, tetrathiafulvalene or metal phthalocyanine.

According to some embodiments of the present disclosure, in the dimmer proposed above, the first electrode is made of at least one of indium tin oxide and graphene. Alternatively, the second electrode is made of at least one of indium tin oxide and graphene.

According to some embodiments of the present disclosure, in the dimmer proposed above, the reflective layer is made of specular silver ink or specular white ink.

According to some embodiments of the present disclosure, the dimmer further includes a first substrate and a second substrate, wherein the first substrate is disposed on a side of the reflective layer away from the electrochromic layer, and the second substrate is disposed on a side of the electrochromic layer away from the reflective layer.

According to some embodiments of the present disclosure, in the dimmer proposed above, the first substrate is made of at least one of glass and polyethylene terephthalate. Alternatively, the second substrate is made of at least one of glass and polyethylene terephthalate.

According to another aspect of the present disclosure, a method for manufacturing a dimmer is also provided in an embodiment. Specifically, the manufacturing method includes steps of: forming a reflective layer; and forming an electrochromic layer on the reflective layer.

According to yet another aspect of the present disclosure, a backlight unit is also provided in an embodiment. Specifically, the backlight unit includes the dimmer as described in any of the above embodiments, wherein the dimmer includes a plurality of brightness adjusting units arranged in an array.

According to some embodiments of the present disclosure, the backlight unit further includes a light guide plate, a first diffusion layer, a first prism, a second prism, and a second diffusion layer stacked sequentially on the dimmer.

According to still another aspect of the present disclosure, a display device is also provided in an embodiment. Specifically, the display device includes a display panel and the backlight unit as described in any of the above embodiments, wherein the dimmer includes a plurality of brightness adjusting units arranged in an array.

According to some embodiments of the present disclosure, in the display device proposed above, the display panel includes a plurality of pixel units arranged in an array, wherein an orthographic projection on the display panel of each brightness adjusting unit in the backlight unit at least overlaps with one pixel unit.

According to still another aspect of the present disclosure, a display device is also provided in an embodiment. Specifically, the display device includes the dimmer as described in any of the above embodiments, wherein the dimmer includes a plurality of brightness adjusting units arranged in an array.

According to some embodiments of the present disclosure, the display device further includes a plurality of pixel units arranged in an array, wherein an orthographic projection of each pixel unit on the dimmer at least overlaps with one brightness adjusting unit.

DETAILED DESCRIPTION OF THE EMBODIMENTS

In order to illustrate the objectives, technique solutions, and advantages of the present disclosure more clearly, the present disclosure will be further described in detail below with reference to the specific embodiments and the accompanying drawings.

Unless otherwise defined, technical or scientific terms used in the present disclosure should be of ordinary meaning as understood by those skilled in the art. Words such as "first" and "second" used in the present disclosure do not denote any order, quantity, or importance, but are used to distinguish between different components. Similarly, words such as "a", "an" and "the" do not denote any quantity limitation, but are used to mean "at least one". Words such as "including" or "comprising" are intended to mean that the elements or objects before such a word encompass the elements or objects and their equivalents listed after the word, and do not exclude other elements or objects. Words such as "connect" or "attach" are not limited to physical or mechanical connections, but may also include electrical connections, whether direct or indirect.

Figure 1:
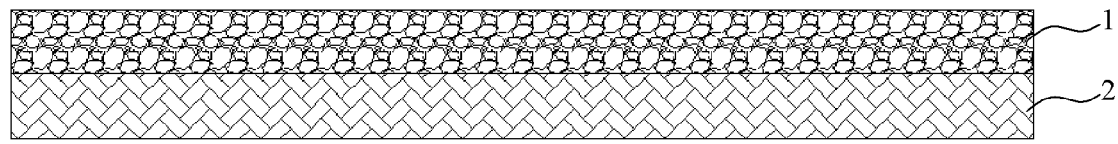
FIG. 1 is a schematic structural diagram of a dimmer according to an embodiment of the present disclosure.

As shown in FIG. 1, a schematic structural diagram of a dimmer according to an embodiment of the present disclosure is shown. As an embodiment of the present disclosure, the dimmer includes at least one brightness adjusting unit, wherein each brightness adjusting unit includes a reflective layer 2 and an electrochromic layer 1 stacked over each other. Further, the electrochromic layer 1 is capable of reversibly switching between a transparent state and a color rendering state, thereby changing the light transmittance of the electrochromic layer 1. Furthermore, the reflective layer 2 is configured to reflect light transmitted through the electrochromic layer 1, for example, to reflect it upwards and make it transmit through the electrochromic layer 1 again, thereby finally leaving the entire dimmer from above.

Thus, in an embodiment of the present disclosure, a dimmer is provided. Specifically, the transmittance of the electrochromic layer can be changed by enabling the electrochromic layer to be reversibly switched between a transparent state and a color rendering state. Further, light transmitted through the electrochromic layer is reflected back by means of the reflective layer, and transmitted through the electrochromic layer again. The electrochromic layer has a minimum transmittance when the electrochromic layer is in a color rendering state. In contrast, the electrochromic layer has a maximum transmittance when the electrochromic layer is in a transparent state. When transmittances of the electrochromic layers in different brightness adjusting units are different, the amount of light transmitted through the electrochromic layers will also be different. That is to say, there is more light transmitted through the electrochromic layer in a transparent state, and less light transmitted through the electrochromic layer in a color rendering state. Therefore, after being reflected by the reflective layer and transmitted again through the electrochromic layer, an area of the electrochromic layer in the transparent state is brighter, and an area of the electrochromic layer in the color rendering state is darker, thereby improving the contrast and display brightness of HDR display for example.

In an embodiment of the present disclosure, the electrochromic layer is utilized to control the reflectivity of the entire dimmer, such that the reflectivity of the dimmer is adjustable. That is, by controlling the reflectivity in different areas of the dimmer, HDR display can be achieved, and the contrast and display brightness of HDR display can be improved. The dimmer can be used in a full size HDR display. In addition, the dimmer is not limited by the arrangement and control manner of light-emitting diodes (LEDs), and is not limited by the complicated structure of the light guide panel (LGP) either. Further, it is not necessary to modify the panel structure and introduce complicated circuit and IC control, so that the maximum light utilization can be ensured for the LEDs. By means of the dimmer, it is also possible to make the display thinner and lighter, without affecting the light transmittance of all structures, and thus without any consumption of useful light in the display light path. In addition, the dimmer has a long cycle life and can meet the high specification requirements of a backlight unit (BLU). Finally, since the electrochromic material has a certain memory function, there is no additional power consumption when the screen is in a non-dynamic display, and the manufacturing cost can be reduced.

Figure 2:
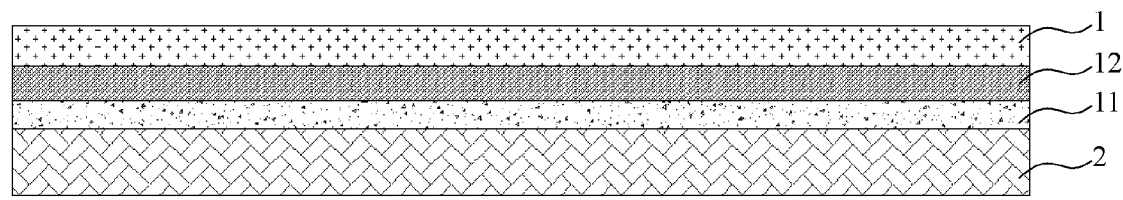
FIG. 2 is a schematic structural diagram of a dimmer according to another embodiment of the present disclosure.

Referring to FIG. 2, a schematic structural diagram of a dimmer according to another embodiment of the present disclosure is shown. As another embodiment of the present disclosure, each brightness adjusting unit further includes an electrolyte layer 12 and an ion storage layer 11 stacked sequentially on a lower surface (i.e., a surface facing the reflective layer 2) of the electrochromic layer 1. As can be seen from above, the entire dimmer outputs light from above. I.e., the light exiting side is the upper surface of the device. Therefore, the reflective layer 2 is disposed on a side of the electrochromic layer 1 away from the light exiting side. That is, the light exiting side of the electrochromic layer is the light exiting side of the dimmer. In an embodiment of the present disclosure, the ion storage layer 11 is used to store corresponding counter ions when the electrochromic layer undergoes a redox reaction, so as to maintain a charge balance of the entire system. The electrochromic layer 1 undergoes a redox reaction under the action of a voltage, thereby being capable of reversibly switching between a transparent state and a color rendering state, and thereby changing the transmittance of the electrochromic layer. Furthermore, the electrolyte layer 12 functions to transport ions.

The electrochromic layer is capable of undergoing a reversible color change upon application of a low driving voltage or current. Specifically, the valence state and composition of the electrochromic material undergo a reversible change under the action of a driving voltage or current, thereby causing a change in the optical properties of the electrochromic material, or keeping a change in the optical properties of the electrochromic material for example. In addition, in order to obtain better electrochromic properties, electrochromic materials are generally required to have good ionic conductivity, high contrast, high color change efficiency, and long cycle time.

In some embodiments of the present disclosure, the ion storage layer 11 may include vanadium pentoxide ions or iridium oxide, thereby providing the electrochromic material with a certain memory function. In some embodiments of the present disclosure, the electrolyte layer 12 includes lithium perchlorate ions or sodium perchlorate ions, so as to increase the response rate of the electrochromic layer to voltage. Electrochromic materials can be classified into inorganic electrochromic materials and organic electrochromic materials. In some embodiments of the present disclosure, the electrochromic layer 1 may include inorganic electrochromic materials, such as titanium dioxide or tungsten trioxide. Alternatively, the electrochromic layer 1 may also include organic electrochromic materials, such as polythiophene, viologen, tetrathiafulvalene or metal phthalocyanine, so as to improve the contrast of electrochromic layer. The color of these electrochromic materials is reversible and the response is quick. In addition, they have a long cycle life, and therefore meet the high specification requirements of BLU. It should be noted that the above materials are merely exemplary, but the technical solutions of the present disclosure are by no means limited to these examples.

As a preferred embodiment of the present disclosure, the electrochromic layer 1 includes titanium dioxide, such that an electrical control between a transparent state and a gray-black state can be achieved. When the electrochromic layer 1 is in the transparent state, the reflective layer 2 can achieve a reflective function without being influenced. In contrast, when the electrochromic layer 1 is in the gray-black state, less light is transmitted, because light is absorbed by the electrochromic layer 1. Thus, after reflection by the reflective layer 2, light emitted again from above the electrochromic layer 1 becomes less. By switching between the transparent state and the gray-black state, it is helpful to adjust the optical quality of BLU. In addition, the electrochromic layer is characterized by a quick response. Therefore, it is possible to become better matched with the higher and higher refresh frequency of modules, thereby achieving a more favorable HDR display effect.

At present, the industrialized supply of electrochromic materials has been achieved. Raw materials and process equipment at both upstream and downstream ends are already mature technologies, and the manufacturing cost is relatively low. Therefore, the dimmer provided by embodiments of the present disclosure is easy to achieve industrialized supply, and the manufacturing cost is relatively low.

Figure 3:
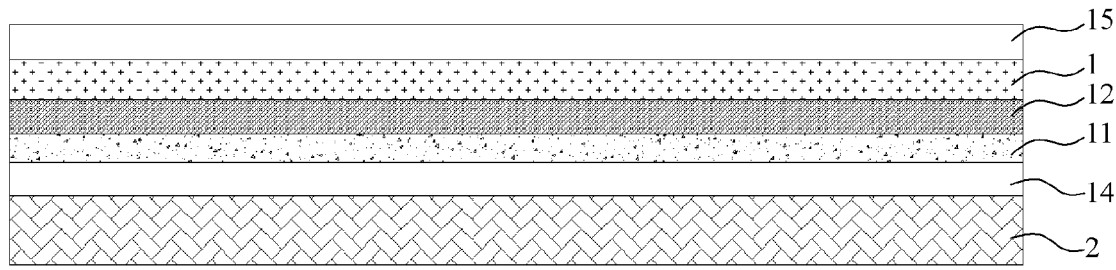
FIG. 3 is a schematic structural diagram of a dimmer according to yet another embodiment of the present disclosure.

Referring to FIG. 3, a schematic structural diagram of a dimmer according to yet another embodiment of the present disclosure is shown. As yet another embodiment of the present disclosure, each brightness adjusting unit includes an ion storage layer 11, an electrolyte layer 12, and an electrochromic layer 1 sequentially stacked. In addition, the brightness adjusting unit further includes a first electrode 14 and a second electrode 15, wherein the first electrode 14 is disposed on a side (i.e., a lower surface) of the ion storage layer 11 away from the light exiting side, and the second electrode 15 is disposed on the light exiting side (i.e., the upper surface) of the electrochromic layer 1. Specifically, the first electrode 14 is disposed between the reflective layer 2 and the ion storage layer 11, and the second electrode 15 is disposed on a side opposite to the first electrode 14, thereby applying a voltage to the electrochromic layer. The first electrode and the second electrode may be used to change a voltage applied to the electrochromic layer, such that the electrochromic layer is capable of reversibly switching between a transparent state and a color rendering state, thereby changing the transmittance of the electrochromic layer. For example, in the case of power-on, the electrochromic layer turns into a transparent state and has a high transmittance. In contrast, in the case of power-off, the electrochromic layer turns into a color rendering state, resulting in a decrease in the transmittance of light. Alternatively, for other suitable electrochromic materials, the electrochromic layer is in a transparent state and has a high transmittance in the case of power-off; but in the case of power-on, the electrochromic layer becomes a color rendering state, resulting in a decrease in the transmittance of light.

Figure 4:
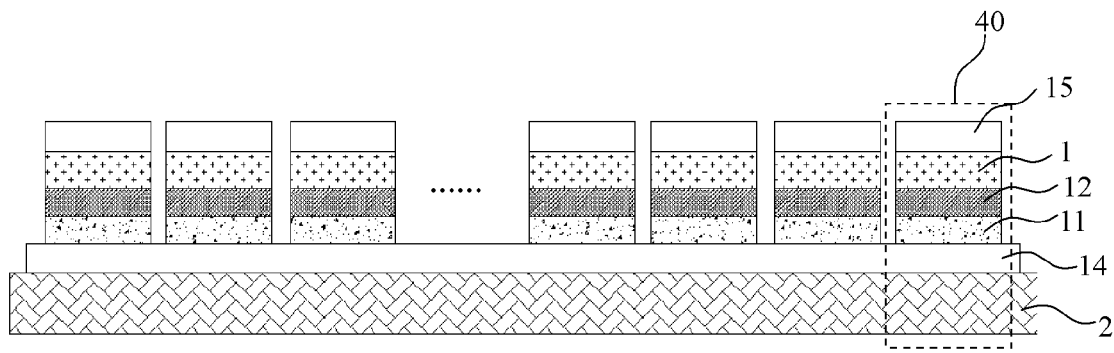
FIG. 4 is a schematic structural diagram of a dimmer according to still another embodiment of the present disclosure.

Referring to FIG. 4, a schematic structural diagram of a dimmer according to still another embodiment of the present disclosure is shown. As an embodiment of the present disclosure, the first electrode 14 is a planar structure, and the second electrode 15 is an array structure. Depending on the display requirements, different voltages may be applied to the array structure in the second electrode 15, such that the voltages applied to the electrochromic layers in different brightness adjusting units 40 can be different, thereby facilitating control over the reflectivity of different brightness adjusting units 40. In this embodiment, the dimmer includes at least one brightness adjusting unit 40, wherein each brightness adjusting unit 40 includes a reflective layer 2, a first electrode 14, an ion storage layer 11, an electrolyte layer 12, an electrochromic layer 1 and an second electrode 15 disposed in a stack. Further, an orthographic projection on the second electrode 15 of the electrochromic layer 1 in each brightness adjusting unit 40 corresponds at least to one substructure in the array structure. Optionally, the electrochromic layer 1 in the dimmer is also an array structure, and has a one-to-one correspondence with the array structure of the second electrode 15. Then, HDR display can be achieved by controlling the reflectivity of the brightness adjusting unit in different areas. Thus, in this embodiment, the plurality of brightness adjusting units of the dimmer share a first, planar electrode 14, and each of them has its own second electrode 15, wherein the second electrodes 15 of all the brightness adjusting units are arranged in an array.

As an embodiment of the present disclosure, alternatively, the first electrode 14 is an array structure, and the second electrode 15 is a planar structure. The specific implementation of such an embodiment is similar to the above embodiment, and will not be described again here.

Figure 5:
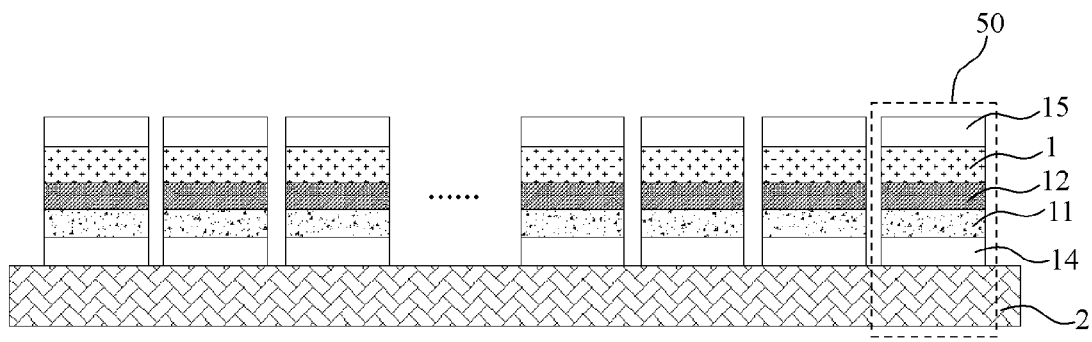
FIG. 5 is a schematic structural diagram of a dimmer according to still another embodiment of the present disclosure.

Referring to FIG. 5, a schematic structural diagram of a dimmer according to still another embodiment of the present disclosure is shown. As an embodiment of the present disclosure, the first electrode 14 is an array structure, and the second electrode 15 is also an array structure. Depending on the display requirements, different voltages may be applied to the array structures in the first electrode 14 and the second electrode 15 respectively, such that the voltages applied to the electrochromic layers in different brightness adjusting units 50 may be different, thereby facilitating control over the reflectivity of different brightness adjusting units 50. The specific implementation of such an embodiment is similar to the above embodiment, and will not be described again here. Obviously, similar to the case in FIG. 4, in the dimmer of FIG. 5, each of the plurality of brightness adjusting units has its own first electrode 14 and second electrode 15, wherein the first electrodes 14, and respectively the second electrodes 16, of all the brightness adjusting units are arranged in an array.

In some embodiments of the present disclosure, the first electrode 14 is made of at least one of indium tin oxide and graphene. In some embodiments of the present disclosure, the second electrode 15 is made of at least one of indium tin oxide and graphene. It should be noted that graphene is a transparent conductive material having a composition of graphene. The first electrode and/or the second electrode are light transmissive conductive materials, so as to ensure the light transmission and a maximum light utilization of the LED.

In some embodiments of the present disclosure, the reflective layer 2 is made of specular silver ink or specular white ink, so as to increase the reflectivity of the reflective layer to meet brightness requirements. Meanwhile, this also helps to improve the contrast between different areas. It should be noted that materials suitable for forming the reflective layer 2 include, but are not limited to, specular silver ink or specular white ink, and any material capable of achieving the reflective effect should be included in the protection scope of the present disclosure.

Figure 6:
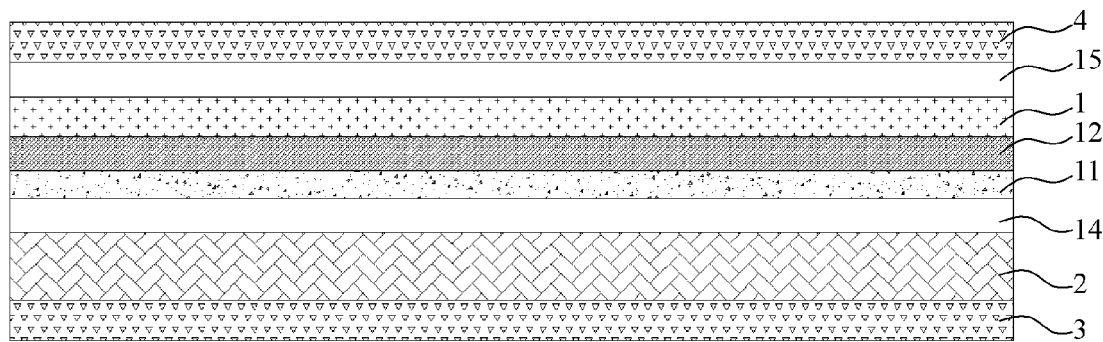
FIG. 6 is a schematic structural diagram of a dimmer according to still another embodiment of the present disclosure.

Referring to FIG. 6, a schematic structural diagram of a dimmer according to still another embodiment of the present disclosure is shown. As still another embodiment of the present disclosure, in addition to a reflective layer 2, a first electrode 14, an ion storage layer 11, an electrolyte layer 12, an electrochromic layer 1, and a second electrode 15 disposed in a stack, the dimmer further includes a first substrate 3 and a second substrate 4. Specifically, the first substrate 3 is disposed on a side of the reflective layer 2 away from the light exiting side (i.e., a lower surface in the figure), and the second substrate 4 is disposed on the light exiting side of the entire dimmer (i.e., the upper surface in the figure). It should be noted that the light exiting side of the reflective layer and the light exiting side of the electrochromic layer are both the light exiting side of the dimmer. The first substrate 3 may function to support the reflective layer 2, and the second substrate 4 may function to protect the electrochromic layer. Therefore, the first substrate 3 and the second substrate 4 collectively function to support and protect the entire dimmer.

In some embodiments of the present disclosure, the first substrate 3 is made of at least one of glass and polyethylene terephthalate. In some embodiments of the present disclosure, the second substrate 4 is made of at least one of glass and polyethylene terephthalate. The glass and polyethylene terephthalate can ensure the transparency of the substrate and the strength of the substrate. In particular, for the second substrate, a transparent material is preferred to avoid affecting the transmission of light.

Figure 7:
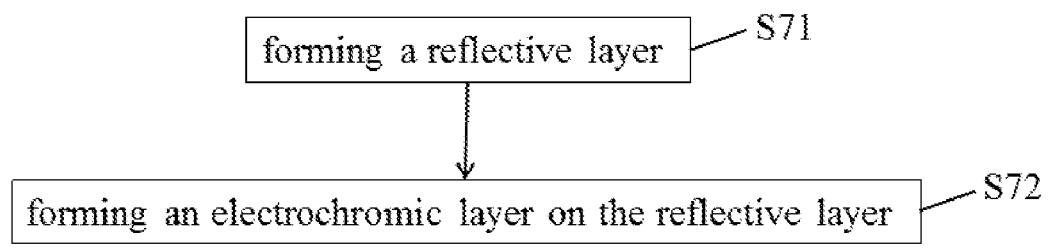
FIG. 7 is a flow chart of a method for manufacturing a dimmer according to an embodiment of the present disclosure.

Embodiments of the present disclosure also provide a method for manufacturing a dimmer. As shown in FIG. 7, a flowchart of a method for manufacturing a dimmer according to an embodiment of the present disclosure is shown. As one embodiment of the present disclosure, a method for manufacturing a dimmer in any of the above embodiments includes the following steps: step 71, forming a reflective layer; and step 72, forming an electrochromic layer on the reflective layer.

Optionally, the reflective layer is made of specular silver ink or specular white ink, so as to increase the reflectivity of the reflective layer and meet the brightness requirements, while still increasing the contrast between different areas. The electrochromic layer is capable of undergoing a reversible color change upon application of a low driving voltage or current. In such a case, the valence state and composition of the electrochromic material undergo a reversible change, thereby causing a change in the optical properties of the electrochromic material or keeping a change in the optical properties of the electrochromic material. At the same time, in order to obtain good electrochromic properties, electrochromic materials are generally required to have good ionic conductivity, high contrast, high color change efficiency and long cycle time.

Thus, embodiments of the present disclosure provide a method for manufacturing a dimmer. Specifically, by forming an electrochromic layer on the reflective layer, the use of liquid crystals is avoided. In this way, problems caused by the toxic, difficult to control, complicated process for injection and package of the liquid crystal are solved, thereby effectively improving the production efficiency of the dimmer and reducing the product development and production costs.

Moreover, in the dimmer thus obtained, the transmittance of the electrochromic layer can be changed by reversibly switching between the transparent state and the color rendering state of the electrochromic layer. Furthermore, the reflective layer is configured to reflect light transmitted through the electrochromic layer and transmit it again through the electrochromic layer. The electrochromic layer has a minimum transmittance when the electrochromic layer is in a color rendering state. In contrast, when the electrochromic layer is in a transparent state, the electrochromic layer has a maximum transmittance. When transmittances of the electrochromic layers in different brightness adjusting units are different, light transmitted through each of the electrochromic layers will be different. Therefore, after being reflected by the reflective layer, the area in the transparent state is brighter, and the area in the color rendering state is darker. In this way, the contrast and display brightness of the HDR display are improved.

As still another embodiment of the present disclosure, the manufacturing method further includes the steps of: forming an ion storage layer on the reflective layer before the electrochromic layer is formed on the reflective layer; and forming an electrolyte layer on the ion storage layer. After that, the electrochromic layer can continue to be formed on the electrolyte layer.

Optionally, the ion storage layer is used to store corresponding counter ions when the electrochromic layer undergoes a redox reaction, so as to maintain a charge balance of the entire system. The electrochromic layer undergoes a redox reaction under the action of a voltage, thereby being capable of reversibly switching between a transparent state and a color rendering state, and thereby changing the transmittance of the electrochromic layer. The electrolyte layer functions to transport ions In some embodiments of the present disclosure, the ion storage layer includes vanadium pentoxide ions or iridium oxide, so as to provide a certain memory function to the electrochromic material. In some embodiments of the present disclosure, the electrolyte layer includes lithium perchlorate or sodium perchlorate ions, so as to increase the response speed of the electrochromic layer to voltage. Electrochromic materials are classified into inorganic electrochromic materials and organic electrochromic materials. In some embodiments of the present disclosure, the electrochromic layer material includes inorganic electrochromic materials, such as titanium dioxide or tungsten trioxide. Alternatively, the electrochromic layer may also include organic electrochromic materials, such as polythiophene, viologen, tetrathiafulvalene or metal phthalocyanine, etc., so as to improve the contrast of the electrochromic layer.

As a preferred embodiment of the present disclosure, the electrochromic layer includes titanium dioxide, such that an electrical control between a transparent state and a gray-black state can be achieved. When the electrochromic layer is in the transparent state, the reflective layer can achieve a reflective function without being influenced. When the electrochromic layer is in the gray-black state, light emitted from above after reflection by the reflective layer becomes less, because light is absorbed by the electrochromic layer and less light is transmitted. This helps to adjust the optical quality of BLU. The electrochromic layer is characterized by quick response. Thereby, it is possible to be matched with the higher and higher refresh frequency of module, thereby achieving an optimal HDR display effect.

As still another embodiment of the present disclosure, the manufacturing method for the dimmer may further include the steps of: forming a reflective layer on the first substrate; forming a first electrode on the reflective layer; forming an ion storage layer on the first electrode; forming an electrolyte layer on the ion storage layer; forming an electrochromic layer on the electrolyte layer; forming a second electrode on the electrochromic layer; and forming a second substrate on the second electrode.

Optionally, the first substrate may be a glass substrate or a polyethylene terephthalate substrate. Alternatively, the first electrode can be deposited on the reflective layer using conventional techniques. Alternatively, the first electrode may be a transparent conductive film, for example, an ITO transparent conductive film or a graphene transparent conductive film. Alternatively, the second electrode may also be a transparent conductive film, such as an ITO transparent conductive film or a graphene transparent conductive film. Optionally, the second substrate may be a glass substrate or a polyethylene terephthalate substrate. The glass and polyethylene terephthalate can ensure the transparency of the substrate and the strength of the substrate. In particular, for the second substrate, a transparent material is preferred to avoid affecting the transmission of light. The first electrode and/or the second electrode are light transmissive conductive materials, and can ensure transmission of light, thereby ensuring a maximum light utilization of the LED.

Embodiments of the present disclosure also provide a backlight unit that includes the dimmer in any of the above embodiments. Optionally, the dimmer includes a plurality of brightness adjusting units arranged in an array. In such a case, HDR display can be realized by controlling the reflectivity of the brightness adjusting unit in different areas. Therefore, in the backlight unit provided by an embodiment of the present disclosure, after being reflected by the reflective layer, the area in the transparent state is brighter, and the area in the color rendering state is darker, thereby facilitating improvements in the contrast and display brightness of HDR display.

Figure 8:
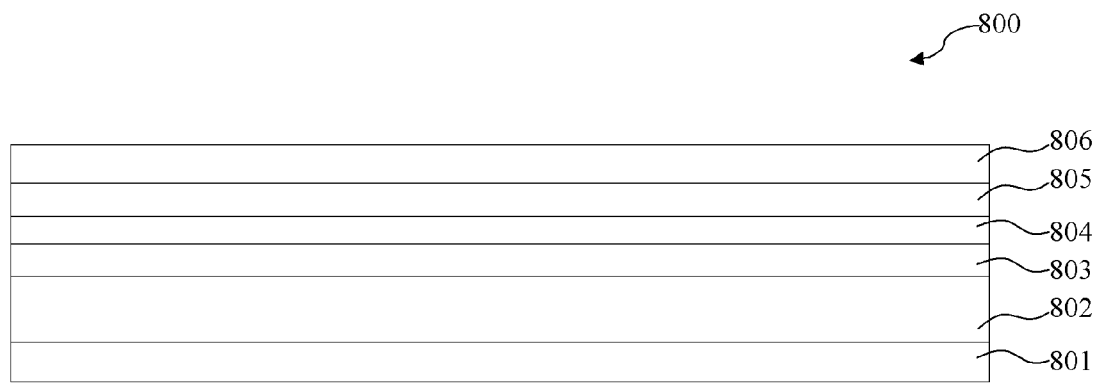
FIG. 8 is a schematic structural diagram of a backlight unit according to an embodiment of the present disclosure.

In an embodiment of the present disclosure, as shown in FIG. 8, the backlight unit 800 may include a dimmer 801, a light guide plate 802, a first diffusion layer 803, a first prism 804, a second prism 805, and a second diffusion layer 806. Specifically, the dimmer 801, the light guide plate 802, the first diffusion layer 803, the first prism 804, the second prism 805, and the second diffusion layer 806 are sequentially stacked. Since the light guide plate has limitations in its own processing, it is difficult to achieve high uniformity for the overall screen of the display device. According to an embodiment of the present disclosure, after the backlight unit is used, the light guide plate can be assisted by changing the reflectivity of different areas in the initial state, so as to achieve an optimum uniform display of the screen.

Embodiments of the present disclosure also provide a display device, including a display panel and a backlight unit in any of the above embodiments. According to an embodiment of the present disclosure, in the display device, global brightness control over the module can be achieved by the cooperation of electrochromic layer and reflective layer. Specifically, by controlling different areas of the electrochromic layer to have different transmittances for light, different areas of the entire display device can be controlled to display different brightness, thereby achieving local dimming up or even global dimming up. Moreover, in embodiments of the present disclosure, neither complicated LED control circuitry nor complicated light guide panel design is required to fit the backlight unit. In addition, complicated and expensive liquid crystal cells are neither required. Therefore, the display device provided by embodiments of the present disclosure is more cost-effective than that according to the conventional technology.

It should be noted that the dimmer may be disposed below the light guide plate of the transmissive display device having a backlight unit. Alternatively, the dimmer may also be disposed below the reflective display device without any backlight unit. In any case, the dimmer can increase the contrast and display brightness of HDR display for these display devices.

Figure 9:
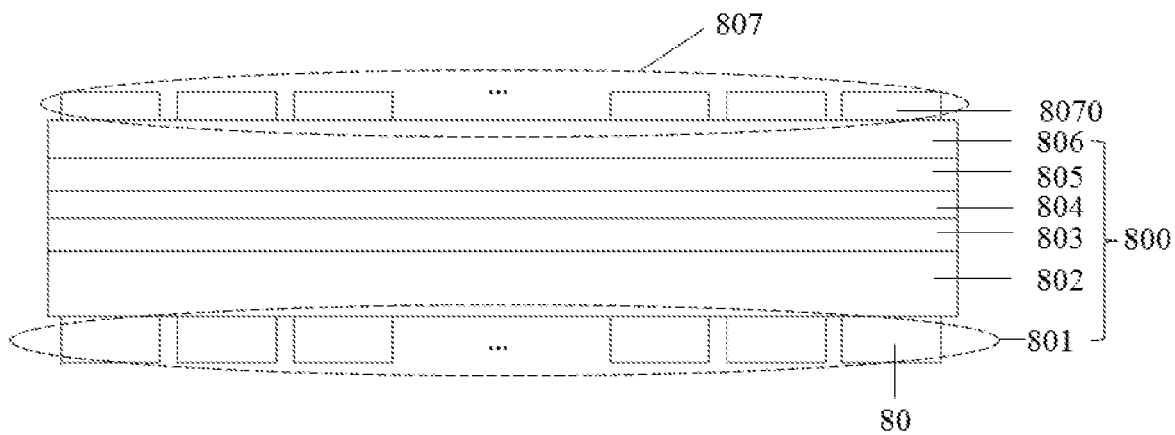
FIG. 9 is a schematic structural diagram of a display device according to an embodiment of the present disclosure.

As an embodiment of the present disclosure, with continued reference to FIG. 9, the display device 900 may further include a display panel 807. Specifically, the display panel 807 includes a plurality of pixel units 8070 arranged in an array. In such a case, advantageously, the orthographic projection of each brightness adjusting unit 80 (i.e., each brightness adjusting unit 80 in the dimmer 801) on the display panel 807 corresponds at least to one pixel unit 8070. Thus, matching between the display panel and the backlight unit can be improved, thereby improving further the contrast and display brightness of HDR display. Specifically, the brightness adjusting unit 80 may also be an array structure.

In some embodiments of the present disclosure, the brightness adjusting unit 80 in the backlight unit 800 is in one-to-one correspondence with the pixel unit 8070 in the display panel 807. That is, the brightness adjusting units 80 are distributed in an array and have a distribution pattern identical to that of the pixel units 8070 that are also distributed in an array. In this way, the display device has higher uniformity.

Thus, embodiments of the present disclosure provide a dimmer, a manufacturing method thereof, a backlight unit, and a display device. Specifically, the transmittance of the electrochromic layer can be changed by reversibly switching the electrochromic layer between a transparent state and a color rendering state. Furthermore, a reflective layer is used to reflect light transmitted through the electrochromic layer. The electrochromic layer has a minimum transmittance when the electrochromic layer is in a color rendering state. In contrast, for example, when the electrochromic layer is in a transparent state, the electrochromic layer has a maximum transmittance. When transmittances of the electrochromic layers in different brightness adjusting units are different, light transmitted through the electrochromic layer will be different. Therefore, after being reflected by the reflective layer, the area in the transparent state is brighter, and the area in the color rendering state is darker, thereby improving the contrast and display brightness of HDR display.

Furthermore, since the dimmer is used as a bottom reflective structure in embodiments of the present disclosure, it does not affect any design of the LED, the light guide plate, and the display panel. As a result, the original design can be retained to the utmost, and the HDR effect can be achieved most quickly. The display device has the advantage of being lighter and thinner than the dual liquid crystal cells. In addition, in the display device, the LED driving circuit and the associated voltage and current are not modified, thereby facilitating a maximum light utilization and maximum lifetime of the LED. Moreover, the display device does not require a direct-type LED, thereby greatly expanding applicabilities of the present disclosure and facilitating full-size HDR display.

The dimmer can be applied to a full size HDR display. Further, the dimmer is not limited by the arrangement and control mode of LEDs, and is not limited by the complicated structure of LGP either. In addition, in the dimmer, it is not necessary to modify the panel structure, or introduce complicated circuit and IC control, thereby ensuring a maximum light utilization of the LED. The dimmer also allows the display to be made thinner and lighter, and does not affect the light transmission of all structures, i.e., without any consumption of useful light in the display light path. Moreover, the dimmer has a long cycle life and can meet the high specification requirements of the backlight unit. Since the electrochromic material has a certain memory function, when the screen is in a non-dynamic display, power is not consumed, so that the manufacturing cost can be reduced.

It should be understood by those of ordinary skill in the art that the discussion of any of the above embodiments is merely exemplary, and is not intended to suggest that the protection scope of the present disclosure (including the claims) is limited to these examples. The technical features in the above embodiments or in different embodiments may also be combined within the concept of the present disclosure, and there are many other variations in the various aspects of the present disclosure as described above. For the sake of brevity, not all of these variations are provided in the details. Therefore, any omissions, modifications, equivalent substitutions and improvements made within the spirit and principle of the present disclosure are intended to be included within the scope of the present disclosure.

The invention claimed is:

1. A display device comprising:
a display panel; and
a backlight unit comprising a dimmer,
wherein the dimmer comprises a plurality of brightness adjusting units in an array, each brightness adjusting unit of the plurality of brightness adjusting units comprises a reflective layer and an electrochromic layer stacked over each other, wherein the electrochromic layer is configured to be reversibly switchable between a transparent state and a color rendering state, and wherein the dimmer is on a light incident side of the display panel and configured to provide incident light to the display panel.

2. The display device according to claim 1,
wherein each brightness adjusting unit further comprises an electrolyte layer and an ion storage layer stacked sequentially on a side of the electrochromic layer facing the reflective layer.

3. The display device according to claim 2,
wherein each brightness adjusting unit further comprises a first electrode and a second electrode,
wherein the first electrode is on a side of the ion storage layer adjacent the reflective layer, and
wherein the second electrode is on a side of the electrochromic layer opposite the reflective layer.

4. The display device according to claim 3,
wherein the first electrode comprises at least one of indium tin oxide or graphene.

5. The display device according to claim 3,
wherein the second electrode comprises at least one of indium tin oxide or graphene.

6. The display device according to claim 2,
wherein the ion storage layer comprises vanadium pentoxide ions or iridium oxide.

7. The display device according to claim 2,
wherein the electrolyte layer comprises lithium perchlorate ions or sodium perchlorate ions.

8. The display device according to claim 1,
wherein the reflective layer comprises a conductive material, and
wherein the dimmer further comprises a second electrode on a side of the electrochromic layer opposite the reflective layer.

9. The display device according to claim 1,
wherein the electrochromic layer comprises titanium dioxide, tungsten trioxide, polythiophene, viologen, tetrathiafulvalene or metal phthalocyanine.

10. The display device according to claim 1,
wherein the reflective layer comprises specular silver ink or specular white ink.

11. The display device according to claim 1, wherein the backlight unit further comprises:
a first substrate and a second substrate,
wherein the first substrate is on a side of the reflective layer opposite the electrochromic layer, and
wherein the second substrate is on a side of the electrochromic layer opposite the reflective layer.

12. The display device according to claim 11,
wherein the first substrate comprises at least one of glass or polyethylene terephthalate.

13. The display device according to claim 11,
wherein the second substrate comprises at least one of glass or polyethylene terephthalate.

14. The display device according to claim 1, wherein the backlight unit further comprises:
a light guide plate, a first diffusion layer, a first prism, a second prism, and a second diffusion layer stacked sequentially on the dimmer.

15. The display device according to claim 1,
wherein the display panel comprises a plurality of pixel units in an array, and
wherein an orthographic projection on the display panel of one brightness adjusting unit of the plurality of brightness adjusting units of the dimmer at least overlaps with one pixel unit.

16. A method for manufacturing a display device comprising a display panel and a backlight unit on a light incident side of the display panel and configured to provide incident light to the display panel, the backlight unit comprising a dimmer, the dimmer comprising a plurality of brightness adjusting units in an array, wherein forming each brightness adjusting unit of the plurality of brightness adjusting units comprises: forming a reflective layer; and forming an electrochromic layer on the reflective layer, wherein the dimmer is on a light incident side of the display panel.

\* \* \* \* \*